United States Patent [19]
Murray, Jr.

[11] 3,789,507
[45] Feb. 5, 1974

[54] MACHINE ELEMENT ALIGNMENT SYSTEM

[76] Inventor: Malcolm G. Murray, Jr., 785 Robindale Rd., Brownsville, Tex. 78520

[22] Filed: Feb. 17, 1972

[21] Appl. No.: 227,525

[52] U.S. Cl. .................. 33/1 SD, 33/1 B, 33/1 M, 235/61 R
[51] Int. Cl. ........................................... G06g 1/00
[58] Field of Search 33/1 R, 1 BB, 1 SB, 1 SD, 1 B; 235/61 R, 61 A, 61 B, 61 G, 61 GM

[56] References Cited
UNITED STATES PATENTS

| | | | |
|---|---|---|---|
| 2,381,836 | 8/1945 | Noble | 33/1 SD |
| 2,720,028 | 10/1955 | Wolf | 33/1 B |
| 3,544,001 | 3/1969 | Hahn | 33/1 M |

Primary Examiner—William D. Martin, Jr.
Assistant Examiner—Milton Gerstein
Attorney, Agent, or Firm—Lowe & King

[57] ABSTRACT

A graphical method for determining corrections required to align one machine element with another employing a plotting board-overlay combination comprising a grid, said grid comprising scale means whereon is represented machine element spatial orientation and dimensions, and a transparent or semi-transparent form for overlay onto said plotting board whereon is plotted said one machine element spatial orientation and dimensions. The method comprises superposing said form onto said plotting board, plotting machine spatial orientation and dimensions of said one machine element onto said overlay form, repositioning said overlay form to correspond with existing machinery orientation, and reading magnitude and direction of said required misalignment corrections directly from said plotting board grid.

20 Claims, 5 Drawing Figures

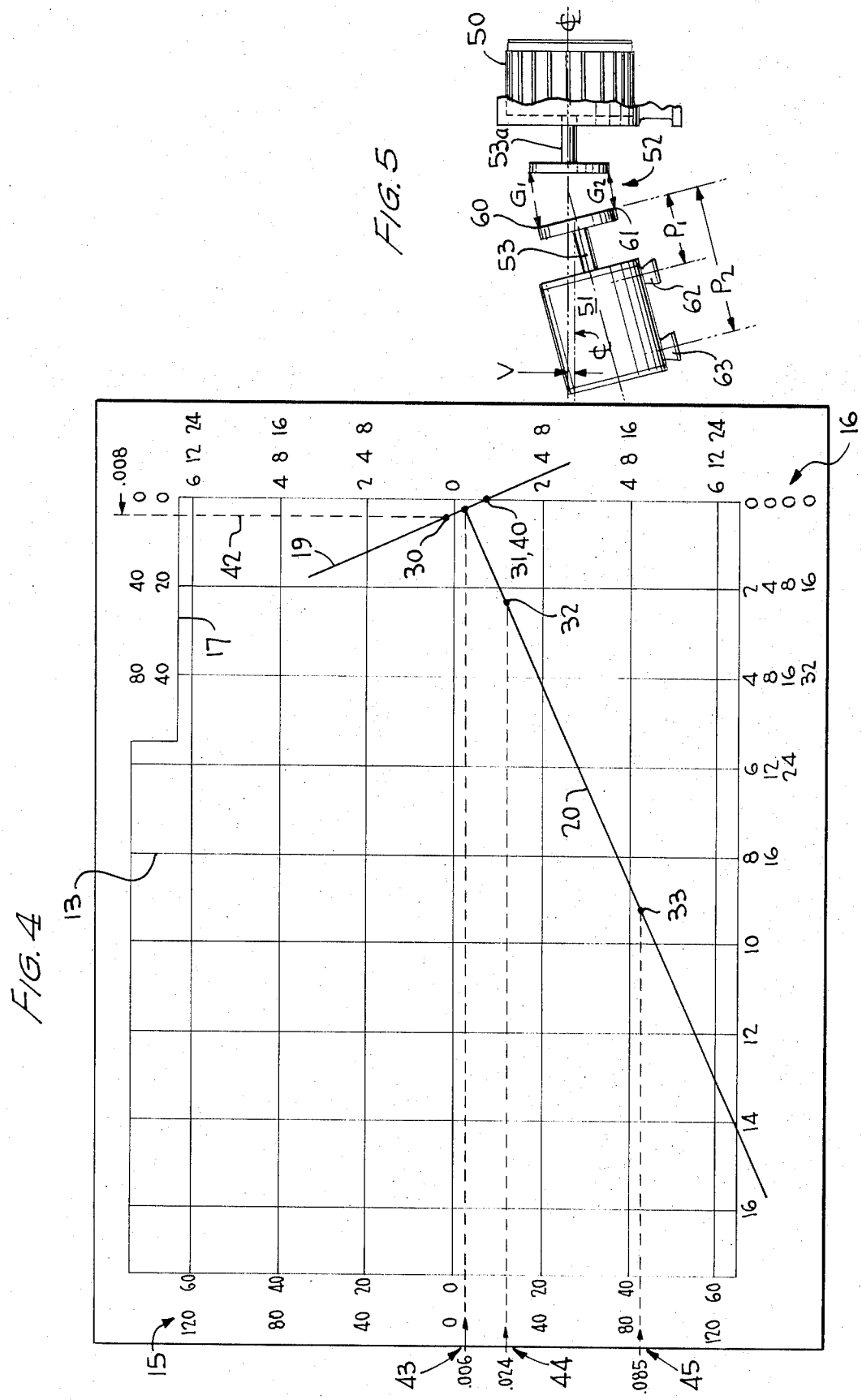

MACHINE ELEMENT ALIGNMENT SYSTEM

The present invention relates to machinery alignment techniques, and, more particularly, to improvements in methods utilizing a graphical technique and structural improvements in the graphical apparatus.

BACKGROUND OF THE INVENTION

The demands placed on machine elements by modern industry are increasing at a rapid pace. Coexistive with these increasing demands, is the increasing complexity of the machine elements thereby making them delicate as well as expensive to repair and replace. It is therefore in the best interests of industry to take all possible precautions wherein machine elements are protected from any needless damage caused through abuse.

The precautions most commonly taken include extensive training courses given to machine operators, installation of elaborate safety and protective equipment, and provision of checklists containing detailed operating instructions.

However, a common cause of machinery abuse has been found to be misalignment existing between driver and driven machine elements. Some of the abuse resulting from such misalignment is alleviated by the installation of flexible couplings which are designed to operate with some degree of misalignment existing between driver and driven machine elements. However, when misalignment becomes large even this type of precaution is not sufficient to protect the machine elements from unnecessary wear. Machinery must then be shut down and realigned.

Anyone familiar with large industry is well aware of the costs accompanying such machine down time. Therefore, it is imperative that machine down time be kept to an absolute minimum.

There are several approaches whereby this alignment down time minimization may be accomplished. One approach might be to provide alignment "experts" whose principal job is to realign machinery. This is sometimes done for complex multi-element machinery trains subject to significant differential thermal growth, using precision optical techniques, eddy current proximity probes, or other specialized methods. For the majority of machines, however, the approach which has seemed to work best in the past is to provide machine maintenance personnel with a method whereby they can realign machinery themselves. This method must be simple enough to be quickly taught to, and assimilated by, average machine maintenance personnel not possessing a skill in geometry and/or trigonometry.

Variations of this last approach are taken by the majority of companies. There are two prevalent methods used, the "face and rim" method and the "reverse indicator measurement" technique. Both of these methods have been found to be easy to use insofar as getting the basic measurements is concerned, but dificult to use for making alignment corrections in an optimum manner. The inherent complexity of determining the latter, if done by normal geometric calculation, makes it difficult to teach or to learn. Another inherent difficulty with these theoretical techniques results in the lack of any simple means whereby existing misalignment can be visualized thereby allowing an operator to quickly spot any erroneous results he has attained from his calculations. In lieu of employing geometric calculation techniques, many machinists who find themselves overwhelmed by their complexity, simply realign machine elements using trial and error which is neither efficient nor accurate enough for modern machine elements.

This invention, therefore, broadly concerns an efficient method for accurately determining corrections required to align one machine element with another.

SUMMARY OF THE INVENTION

The present invention provides a method for accurately determining corrections required to align one machine element with another by employing a plotting board-overlay combination to graphically determine said required correction. The plotting board comprises a grid; said grid comprises normalized scale means along one axis upon which is represented machinery dimensions and misalignment, and scale means along another axis upon which is represented machinery dimensions, angular misalignment, and spatial orientation. The overlay comprises a form corresponding to said one machine element. Said form is overlaid onto said grid to determine required corrections. Said overlay is constructed of mark-receptive transparent or semi-transparent material to allow plotting of machine orientation and dimensions directly onto said overlay using an ordinary marking instrument. Machine element spatial orientation and dimensions are represented to scale according to said scale means. The scale means are calibrated to allow direction and magnitude of machine element misalignment to be read directly from said plotting board when said overlay form is properly positioned onto said plotting board.

The method of determining misalignment corrections comprises positioning said overlay form coincident with the scale means of said grid, plotting said one machine element dimensions and ideally aligned spatial orientation onto said overlay form, positioning said form to correspond with the existing machine spatial orientation as attained from readily available measurements, and finally, reading magnitude and direction of said required misalignment corrections directly from said plotting board.

The scale means is an important feature of this invention because it provides versatility and efficiency to the inventive method. Said scale means allows machinery dimensions and spatial orientation to be directly plotted to scale onto said overlay and said misalignment to be read directly from said plotting board grid without performing any mathematical manipulations. This feature facilitates using the technique and eases the burden of teaching same. The scale means is normalized thereby providing a means whereby a large variety of units may be selected. The scale means also provides a means for increasing accuracy of the alignment procedure by repeating corrections using successively larger scales.

The overlay form is another important feature of this invention because it provides a means whereby existing spatial orientation and dimensions of said machine elements may be quickly and easily represented to the proper scale and thereby visualized. Such visualization increases the efficiency and accuracy of any alignment corrections.

OBJECTIVES OF THE INVENTION

As can be seen from the above brief description, a broad objective of the present invention is to provide an accurate and efficient method of determining corrections required to align one machine element with another.

Another objective is to provide a method which is easily assimilated and applied by one unskilled in the science of mathematics.

Another objective is to provide a means whereby existing misalignment of machine elements is easily visualized thereby expediting the realignment process.

Still another objective of this invention is to provide a plotting board overlay combination which is both portable and durable.

Still another objective of this invention is to provide a grid containing a plurality of normalized scales whereby versatility and accuracy are afforded to the invention.

Still another objective of this invention is to provide scale means calibrated to allow direct representation and reading of said machine dimensions, spatial orientation and misalignment without performing any mathematical manipulations.

Still another objective of this invention is to provide a method which does not require scale drawings or plots.

Still other objects and advantages of this invention will be readily apparent to those skilled in the art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 4 is a plan view of the plotting board-overlay combination showing the form positioned to correspond with an existing misalignment of the machine elements; and FIG. 5 is a side view, partially cut away, showing a driver machine element in a misaligned position with a driven machine element.

DETAILED DESCRIPTION OF THE PREFERRED EMBODIMENT

For convenience, the preferred embodiment will be described in three distinct sections. The first section will be a detailed description of the apparatus required by the alignment method. This section will then be followed by a detailed description of the method itself. Following that, a sample of the method will be presented. Each section will contain appropriate cross reference where required for clearer understanding.

Figure 1:
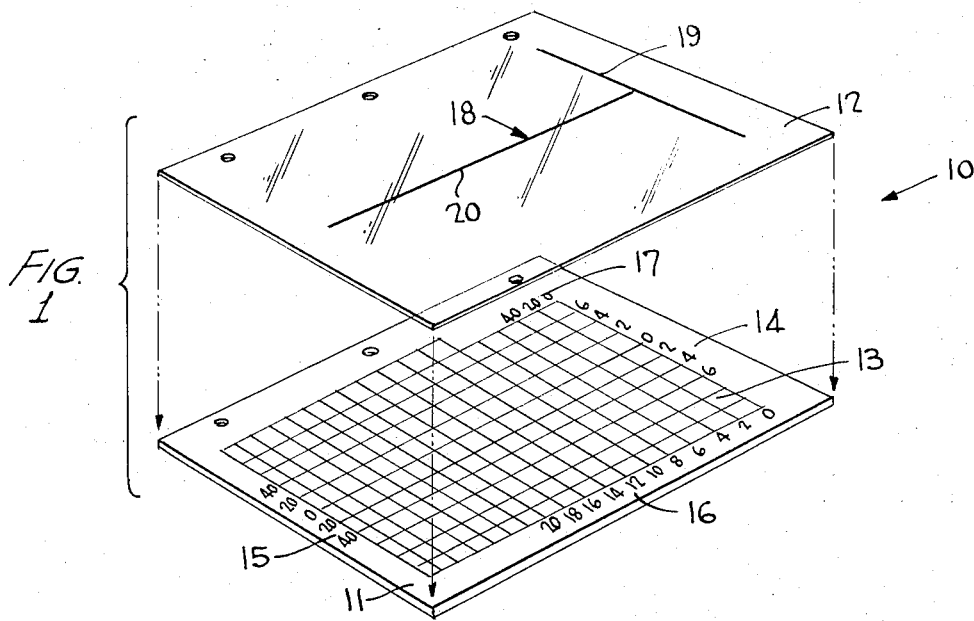
FIG. 1 is a perspective view of the plotting board-overlay combination.

With reference to FIG. 1, the apparatus may broadly be described as a plotting board-overlay combination, generally denoted by the numeral 10 comprising a plotting board 11, and overlay 12. Said plotting board 11 comprises a grid means 13, normalized scale means 14 upon which is represented pertinent machinery or jig dimensions, perpendicular to longitudinal or shaft axis, normalized scale means 15 upon which is represented machinery misalignment, normalized scale means 16 upon which is represented machinery spatial orientation and/or longitudinal dimensions, and normalized scale means 17 upon which is represented machinery gap spacing difference, between two reference points 180° from each other on the coupling or jig face of the machine element to be moved for alignment, and similar points on the machine element to remain fixed (to be discussed below).

Figure 2:
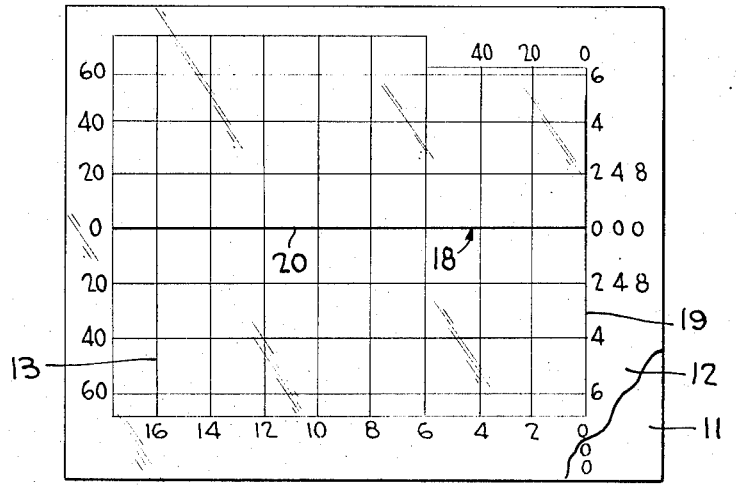
FIG. 2 is a plan view of the plotting board-overlay combination showing the overlay superposed over the plotting board.

The overlay has represented thereon a T-shaped form generally shown by 18. When said overlay 12 is superposed upon said plotting board 11, as shown in FIG. 2, said form 18, containing a vertical leg 19 (also shown in FIG. 1) coincident with scale means 14 and horizontal leg 20 (also shown in FIG. 1) coincident with scale means 16, is amenable to receiving direct representation of said machine element dimensions and spatial positioning.

In the preferred embodiment, the grid 13 is encased in rigid, relatively thick transparent plastic by lamination to provide a durable construction of said plotting board 11. It can be seen, however, that any flat, rigid durable material may be used as a base for said grid. The overlay 12 is also shown in the preferred embodiment to be a thin durable transparent or semi-transparent pencil-accepting material, such as a thin plastic of laminated construction such that the permanent form lines are within the lamination and thus protected from erasure or other obliteration. However, any similar thin transparent or semi-transparent marker-accepting material may be used for said overlay.

Plotting board 11 also contains a sheet on the underside or reverse surface (not shown) giving detailed instructions on the use of the inventive method. Said sheet can be permanently affixed to said underside surface (within the transparent lamination in the preferred embodiment) thereby providing a quick reference means by merely flipping the board 11 over when needed.

Because the combination 10 is expected to be used in a rugged environment, a durable construction such as that provided is a requisite.

With reference to FIG. 2, it is seen that scale means 14, 15, 16 and 17 form an important feature of the invention. As seen in this figure, these scale means are each comprised of a plurality of scales. As best seen in FIG. 4, each scale is normalized thereby contributing to the overall versatility of the invention by allowing a wide range of units of measure to be read from the grid 13. To explain, if the beginning error in alignment of the machinery is great, the scale farthest from the grid lines is used to accommodate the distances and to give an appropriately less detailed correction reading. As the machinery is brought more into alignment or for small errors, the scales closer to the grid lines having a lesser range are used, which in turn give a more precise correction reading.

As seen by comparing FIG. 1 with FIG. 2, when the overlay 12 is superposed onto the plotting board 11, form 18 aligns with said scale means. By allowing vertical leg 19 to align with scale means 14, coupling or jig radial measurement points of the one machine element being moved for alignment can be plotted directly onto said overlay 12 using the units of said scale means 14 without requiring any further scaling of said machine element dimensions. However, it is understood that other convenient dimensions or points on either machine element may be selected. Similarly, by allowing horizontal leg 20 to align with scale means 16 and using the units of said scale means 16, said one machine element spatial orientation and/or longitudinal dimensions to alignment reference points can be plotted directly onto said overlay 12, also without further scaling operations. This feature, by deleting the need of a scaling operation, expedites both the use of the invention and assimilation of that use. The deletion of scaling requirements, by reducing the number of steps required in obtaining an alignment correction, correspondingly reduces the probability of error.

As will be further discussed in the following description of the method embodied by this invention, scale means 14, 15, 16 and 17 are calibrated according to a geometric and trigonometric relationship which allows machine element misalignment corrections to be read directly from said scale means 15 without requiring further calculations. This feature, also, encourages expeditious use and easy learning of the method.

As seen in FIG. 2, form 18 and scale means 14 and 15 are positioned so as to allow accommodation of both positive and negative measurements. This is an integral feature of the invention which allows measurement, optimum correction determination, and corrective adjustment to be made in terms compatible with common measuring instruments and techniques.

It can be concluded, from a geometrical consideration, that a minimum of two measurements are required in each plane when correcting misalignment existing between two machine elements of known dimensions and spatial relationship; an angular measurement plus a displacement or "parallel" measurement. This is most commonly done by the "face and rim" method mentioned earlier. Scale means 17 provides a means whereby said angular measurement may be an input of the inventive method. Said angular misalignment is known as "gap" spacing difference and manifests itself in an angular intersection of the shaft axes of the two machine elements here considered.

Measurements of gap spacing difference are obtained by means of a variety of instruments, such as a leaf-type feeler gauge, inside micrometer, or dial indicators, and a single value for gap spacing difference is therefore readily attainable for input into this method, as will be seen later in detail. Measurement of displacement or "parallel" misalignment is done by a dial indicator supported by the shaft of the fixed machine element, with sensing tip contacting the coupling hub rim of the machine element to be adjusted for alignment. Variations of this mounting arrangement, using jigs, may also be employed.

Scale means 15 provides a means whereby said displacement misalignment may also be an input to this method. As previously discussed, scale means 14 is used to represent the machine element or jig dimensions perpendicular to shaft axis, and scale means 16 is used to represent machine element orientation and/or longitudinal dimensions thereby completing the required inputs.

With reference to FIGS. 2, 3, 4 and 5, the method embodied by this invention will now be described in detail. Basically, the misaligned machine elements comprise a driven element 50 (such as, a fan or blower) and a driver element (such as, an electrical motor) 51 (see FIG. 5) which are connected by a flexible coupling member 52. Driver element 51 is connected to flexible coupling member 52 by means of connecting member or shaft 53 and driven element is connected by member or shaft 53a. It will be assumed in the following discussion that all requisite measurements are available by use of conventional engineer's instruments and scales.

As a preliminary step, once the stationary and movable machine elements are selected, corrections of any large misalignments are made by using any convenient method such as applying a straight edge to both elements and adjusting the movable machine element to align with said straight edge. This preliminary step can be used to roughly correct large displacement as well as angular misalignments, but can be omitted if touch-up or "hot" corrections are being made. It will be assumed in the description of the method, and in the example which follows, that driver element 51 is moved and driven element 50 remains stationary. However, the method is not limited to this particular selection.

Two-dimensional misalignments are corrected merely by correcting misalignment in one plane (either horizontal or vertical), then repeating the procedure in the remaining plane. Subsequent repetitions may be done until alignment accuracy is within allowable limits. For convenience, said movable machine element 51 will be represented on said overlay 12 in the following method description and example, however it is understood that either machine element may be represented on said overlay form.

The graphical method is begun by placing said overlay 12 onto said plotting board 11, as shown in FIG. 2, so that the intersection of legs 19 and 20 of form 18 coincide with the origin of scale means 14, 15, 16 and 17. As previously discussed, this position allows dimensions and spatial orientation of driver element 51 to be represented directly onto said overlay. As seen in FIG. 2, the position shown by said form 18 represents the "ideal" position of said machinery without any misalignment between driver element 51 and driven element 50.

Figure 3:
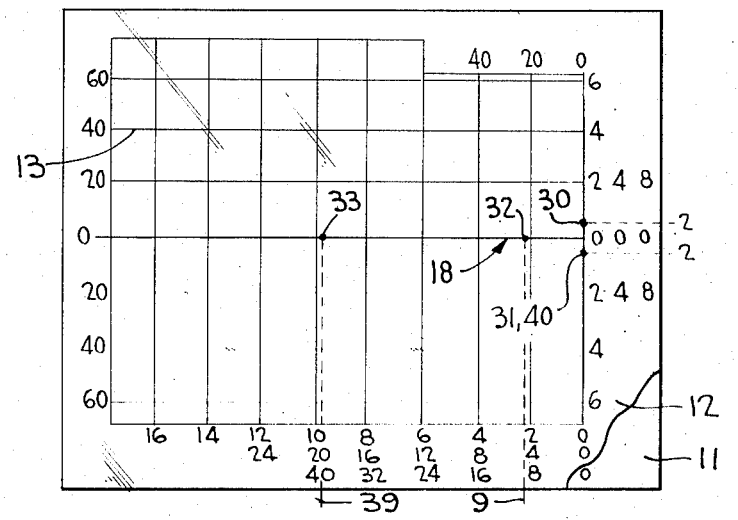
FIG. 3 is a plan view of the plotting board-overlay combination showing the dimensions of one machine element plotted onto the overlay form.

As shown in FIG. 3, the next step in the graphical method is completed by plotting machine element dimensions directly onto said overlay form. The marks denoted by numbers 30 and 31 represent machine element dimensions, such as the diametrical distance between the circumferential points 60 and 61 of the coupling hub of shaft 53, as shown in FIG. 5. This measurement may be taken by use of outside calipers and engineer's scale. However, it should be understood that the marks 30 and 31 may also represent positions of any other convenient points of equal radii on said connecting element, attached jig, or the flexible coupling hub relative to the movable machine element 51, and are chosen in this description as circumferential points merely for convenience.

As shown in FIG. 5, two additional convenient points of reference on said machine element 51 are inboard feet 62 and outboard feet 63. The distance between the face of said flexible coupling and said inboard feet is shown in FIG. 5 as $P_1$ and is represented in FIG. 4 as mark 32. Similarly, for said outboard feet 63, distance $P_2$ in FIG. 5 is shown as mark 33 in FIG. 4. Thus, the "face" of said flexible coupling 52 has been chosen as a convenient reference axis from or at which all measurements are made. Again, selection of the inboard feet and outboard feet of machine element 51 was merely for convenience and the method is not limited to selection of these reference points. Since alignment corrections are usually applied at the feet, however, these reference points will normally be the points chosen.

The method is then continued by selecting the proper fulcrum point corresponding to the face measurement point on said flexible coupling 52, connecting member 53, or attached jig, shown as mark 31, and turning the overlay 12 to angularly reposition the form 18 about the mark 31, as shown in FIG. 4. By comparing FIGS. 4 and 5, it can be seen that horizontal leg 20 now corresponds to the center line of the connecting member 53, thus visualization of the misalignment is enhanced.

The fulcrum point is also designated in FIG. 4 by the numeral 40 for further identification. As seen by comparing FIGS. 3 and 4, said fulcrum point 40 was chosen to coincide with coupling point 61 of FIG. 5 (hence mark 31 of FIG. 3). However, an often convenient variation is to locate the fulcrum point at the intersection of legs 19 and 20 and double the marked distance to points 30 and 31, but it is understood that any convenient point in said flexible coupling member may be chosen as said fulcrum point without altering the basic features of the correction.

Overlay 12 is rotated about mark 31 until mark 30 coincides (note dashed line in FIG. 4) with appropriate gap spacing difference, as read on scale means 17. Said gap spacing difference is seen in FIG. 5 to be the spacing difference between measurement faces of element 50 and element 51. The spacing is measured at a minimum of two points on said elements 50, 51. Ideally, measurements are made 180° apart and are shown in FIG. 5 as $G_1$ and $G_2$. The net difference between $G_1$ and $G_2$ is known as the gap spacing difference and is represented on scale means 17 as point 42 in FIG. 4. This step is thus seen to represent said angular misalignment existing between said machine elements.

The next step in the method is to represent the displacement misalignment that has been determined, again by any suitable measurement technique. Said displacement misalignment is seen in FIG. 5 to be the amount of vertical offset V existing between the center line of connecting members 53a and 53 at the plane of measurement. This step is accomplished (as shown in FIG. 4) by moving said overlay 12 vertically or in the direction of the scales 14, 15 on said plotting board (without changing said gap spacing representation or moving fulcrum point 40 from the origin of scale means 16) until a point on leg 19 corresponding to the displacement misalignment measurement point (shown here as the point of intersection of legs 19 and 20) is moved a distance from the origin (zero point) of scale means 14 to correspond to said displacement misalignment as read on scale means 15. Said displacement misalignment is represented by point 43 in FIG. 4. It is seen in FIG. 4 that the form 20 is now arranged relative to the aforementioned ideal alignment position so as to represent the actual, existing displacement and angular positioning of said movable machine element 51 relative to said stationary machine element 50. If the displacement misalignment measurement point is located longitudinally at or near the face measurement points, it can be represented as shown, by the intersection point of legs 19 and 20. If in addition, as mentioned earlier, fulcrum point 40 is located at this same point by doubling the marked distance to points 30 and 31, the overlay positioning is made easier by permitting initial movement of point 40 to a position along scale 14 to correspond to displacement misalignment as read on scale means 15. The overlay can then be pivoted about this fulcrum point until point 30 or 31 (as appropriate) is at a distance from scale 14 an amount representing angular misalignment as shown on scale means 17.

The misalignment of the reference points or feet 62, 63 is now read on scale means 15. The distance between said marks 32 and 33 and the origin of the scale means (or ideal alignment) represented by points 44 and 45, respectively, represents the amount of misalignment in the plane of measurement existing between said machine elements referenced to the longitudinal positions of points 62 and 63, respectively. Specifically, point 44 corresponds to the amount of misalignment existing between inboard feet 62 and the desired correctly aligned position. Similarly, point 45 corresponds to the amount of misalignment existing between outboard feet 63 and the correctly aligned position. The method is thus completed by simply reading the amount of misalignment existing between marks 32 and 33 and the ideal position directly from scale means 15. The new position of the machine element 51 is now located and alignment of the elements 50, 51 can be achieved by simply moving the feet 62, 63 through the distances and in the direction toward ideal alignment position represented by points 44, 45 on the scale means 15. The movement of only the one element 51 is desirable in this method to avoid double iterations that would appear if both elements 50, 51 were to be moved.

The foregoing explanation assumes use of the "face-and-rim" method of measurement. At times, it may be advantageous to employ instead the "reverse-indicator" method. The plotting board and overlay may be used equally well with this latter method, with a few changes in procedure. Scales 14 and 17 are not used, and scale 16 is used to plot distance between oppositely supported indicator sensing tips, one on each coupling hub rim or equivalent jig surface, of the two machine elements, as well as longitudinal dimensions to adjustment reference points. Scale 15 is used in the same way as before, to plot misalignment input derived from dial indicator readings, and to read amounts and directions of corrective adjustments required. This method is in some ways simpler to apply than the face-and-rim method, but is less accurate when coupling gaps are short.

The steps of the above methods are repeated as many times as necessary using progressively more and more specific scales to bring the elements into final alignment within the tolerances required. For two-dimensional misalignment, it can be assumed that the method is performed first for vertical misalignment as described, and then is performed again in the horizontal plane using the same principles. That is, the view of FIG. 5 should merely be visualized as a top view, or displaced 90° from the side view shown, and the same or different (as desired) reference points may be selected with the correction being an appropriate horizontal rather than vertical movement. Although direct vertical and horizontal measurements are by far the most common, the plotting board method is not limited to these, but may also be used similarly with measurements made in other planes, as with inclinometer-polar coordinate techniques.

In order to clarify the procedure embodied by this invention, a numerical example will be described. The method in the numerical example will correspond identically to the above-described method and the reference points, such as the fulcrum point, will similarly correspond to the reference points used in the above-described method. It will be assumed that the preliminary step removing large misalignment has been completed. In this example, only vertical misalignments will be considered; however, the procedure is identical for horizontal misalignments.

For a net gap spacing difference ($G_1$ minus $G_2$) of 0.008 inches, a vertical displacement misalignment (position of member 53 centerline relative to member 53a centerline at plane of measurement, or distance V) of 0.006 inches, a measurement diameter of 4 inches for said connecting element 53, 53a, 9 inches for distance $P_1$, and 39 inches for distance $P_2$, the correction required using the above-mentioned face and rim method will be found from scale means 15 to be 0.024 inches for the inboard feet 62 and 0.085 inches for the outboard feet 63.

Thus, as seen in FIG. 4, if said inboard feet 62 are moved vertically upward 0.024 inches and said outboard feet 63 are moved vertically upward 0.085 inches, perfect alignment between driver element 51 and driven element 50 will result. In actual practice, due to such factors as misalignment in one plane affecting accuracy of measurements in another plane, several repetitions of vertical followed by horizontal alignment measurements and corrections may be required, before acceptable alignment accuracy is achieved.

In summary of the salient features of the invention, a plotting board-overlay combination 10 is utilized in carrying out a graphical method of determining corrections required to align one machine element with another. Said plotting board-overlay combination comprises a plotting board 11 comprising a grid 13 and a plurality of scale means 14, 15, 16 and 17, whereon is represented machine element dimensions and spatial orientation. The particular arrangement of said scale means provides versatility to the method by allowing a wide range of units and dimensions to be selected and further provides expediency to the method by allowing direct scaling and reading of all pertinent measurements. The overlay 12 with the T-shaped form 18 having a first or vertical leg 19 for element dimensions and a second or horizontal leg 20 for orientation of reference points, is used to represent the spatial and angular position of the movable machine element 51 relative to the stationary machine element 50, thereby providing easy visualization of misalignment and determination of the corrections required to realign said machine elements.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. A graphical method for accurately determining corrections required to align one machine element with another comprising the steps of plotting machine dimensions and spatial orientation of reference points where correction is to be applied, onto an overlay having a form corresponding to said one machine element, superposing said form onto a plotting board having a grid, said grid having first scale means along one axis upon which is represented machinery dimensions, displacement misalignment at plane of measurement, and misalignment at said reference points, and second scale means along another axis upon which is represented machinery dimensions, angular misalignment, and spatial orientation, repositioning said form on said grid to correspond to existing machine misalignment at plane of measurement and reading magnitude and direction of said misalignment at said reference points directly from said grid.

2. The method of claim 1 including holding one machine element stationary thereby avoiding double iterations required when both machine elements are allowed to move.

3. The method of claim 1 including a preliminary step of adjusting gross misalignments by means of a straight edge by the steps of laying said straight edge on said stationary machinery and adjusting said movable machine element to align with said straight edge.

4. The method of claim 1 including initially superposing said overlay form to coincide with said scale means during said plotting step, thereby allowing direct representation of said one machine element dimensions and spatial orientation to guide the plotting step.

5. The method of claim 1 further including providing said form as a T-shaped figure and plotting dimensions of the movable machine element along the first leg of said T figure thereby allowing direct representation and reading of said dimensions.

6. The method of claim 5 including plotting orientation reference points of said machinery on the second leg of said T-shaped figure thereby allowing direct representation and reading of said orientation.

7. The method of claim 1 including repeating said method until misalignment of said machinery is within tolerance limits.

8. The method of claim 1 including first carrying out the method in a vertical plane, and repeating said method when correcting two-dimensional misalignment in a horizontal plane, said repetitive steps including a vertical movement of said misaligned machinery correcting angular and displacement misalignment in the vertical plane followed by a horizontal movement making a similar correction in the horizontal plane.

9. A plotting board overlay combination used in determining corrections required to align one machine element with another, said combination comprising a grid, said grid comprising first scale means along one axis upon which is represented machinery dimensions, displacement misalignment at plane of measurement, and misalignment at reference points where correction is to be applied; and second scale means along another axis upon which is represented machinery dimensions, angular misalignment, and spatial orientation, and a form corresponding to said one machine element for overlay onto said grid to determine said corrections by intersection of said first and second scale means by said form at predetermined points according to said machinery dimensions and misalignment, and said spatial orientation, respectively.

10. The combination of claim 9 wherein said first and second scale means are normalized to accommodate wide range of conditions.

11. The combination of claim 9 wherein the origin of at least one of said scale means is positioned so as to allow both positive and negative measurements to be read from said scale means.

12. The combination of claim 9 wherein said scale means are calibrated in terms of direct distances representing misalignment whereby machine element misalignment may be read directly from said grid without requiring any mathematical manipulations.

13. The combination of claim 9 wherein a first leg of said form is coincident with one axis of said grid and a second leg is coincident with the other axis of grid to allow scaling of all requisite measurements onto said overlay using said grid.

14. The combination of claim 9 wherein said overlay is constructed of mark receptive see-through material to allow plotting of machinery orientation and dimensions directly onto said overlay.

15. The combination of claim 9 wherein said plotting board comprises an instruction sheet affixed to the backside of said grid to allow teaching or reviewing the use of said combination expeditiously.

16. The plotting board of claim 15 wherein said board is laminated and substantially rigid to provide durability.

17. The combination of claim 9 wherein said second scale means includes a plurality of scales representing numerical values of gap spacing difference between said machine elements thereby allowing direct reading of said spacing difference from said grid.

18. The combination of claim 9 wherein said first scale means includes a plurality of scales representing numerical values of dimensions of said one machine element thereby allowing said element to be scaled directly onto said overlay form.

19. The combination of claim 9 wherein said second scale means includes a plurality of scales representing numerical values of misalignment of said machine elements thereby allowing direct reading.

20. The combination of claim 9 wherein said second scale means includes a plurality of scales representing numerical values of machinery spatial orientation thereby allowing said orientation to be scaled directly onto said overlay form.

* * * * *